United States Patent [19]

Dickenson

[11] 4,194,692
[45] Mar. 25, 1980

[54] FLIGHT THRUST REVERSER AND VERTICAL THRUST CONTROL DIVERGENT NOZZLE SYSTEMS

[75] Inventor: Robert A. Dickenson, Chula Vista, Calif.

[73] Assignee: Rohr Industries, Inc., Chula Vista, Calif.

[21] Appl. No.: 822,388

[22] Filed: Aug. 5, 1977

[51] Int. Cl.² ............... B64C 15/06; B64D 33/04
[52] U.S. Cl. ..................... 239/265.39; 239/265.33
[58] Field of Search ............... 239/265.19, 265.29, 239/265.33, 265.39, 265.41; 60/229

[56] References Cited

U.S. PATENT DOCUMENTS

| 2,753,684 | 7/1956 | Greene | 239/265.29 |
| 4,093,122 | 6/1978 | Linderman et al. | 239/265.29 X |

*Primary Examiner*—Robert W. Saifer
*Attorney, Agent, or Firm*—Patrick J. Schlesinger; Frank D. Gilliam

[57] ABSTRACT

An integrated thrust reverser vertical thrust control and divergent nozzle for controlling the exiting gases from a thrust producing aircraft engine. The nozzle comprises at least two nozzle reverser doors that are pivotable about a fore and aft aircraft pivotal connection and an actuator system for pivoting the doors. The pivotable connection at each pivot point is remotely disengageable allowing the doors to selectively pivot about either their forward or aft connection. The doors can be positioned through an infinite number of different positions through their travel about either pivotal connection. When in a forward thrust mode the two nozzle reverser doors pivot about their forward pivot point, when in a reverse mode about their aft pivot connections and a combination of forward and aft pivot connections for aircraft vectoring.

8 Claims, 12 Drawing Figures

FLIGHT THRUST REVERSER AND VERTICAL THRUST CONTROL DIVERGENT NOZZLE SYSTEMS

BACKGROUND OF THE INVENTION

The invention relates generally to a thrust control device for gas turbine jet engines and more specifically to combined jet gas divergence reversing and aircraft vectoring when used in conjunction with a variable convergent nozzle.

A common method for the diverging engine jet is by translating the engine center body or plug. This method requires the placement of actuation means within the engine exhaust stream. This positional placement subjects the actuation means to extreme heat, which requires that the structure and actuation mechanism be extremely heavy, thereby lowering the overall efficiency of the aircraft.

Another method for divergence of engine exhaust gases is by translating the outer wall or cowling structure surrounding the engine exit nozzle. This method is limited in its cross-sectional nozzle variation capabilities due to the predetermined optimum inner nozzle surface configuration and the slope or incline of its translation track.

These methods of divergence do not include thrust reversing capabilities; therefore, for combined operation, there must additionally be provided on the aircraft one of the many known thrust reversing mechanisms. The utilization of two separate systems results in an increase of aircraft structure weight and adds to the complexity of controlling the combined apparatus.

U.S. Pat. No. 3,779,010 teaches a combination thrust reverser with means for varying the effective nozzle throat area for thrust divergence. This teaching has several disadvantages; namely, there is only one position of cross-sectional nozzle variation and a portion of the gas stream is directed through the nozzle wall to the side of the aircraft, reducing the thrust efficiency of the engine.

These and various other methods for nozzle throat area variations and reversing are equally as complex as the above methods, are excessively heavy, and generally restrict engine accessibility for maintenance and repair due to the time and effort required to remove from and reinstall the various mechanisms on the aircraft.

SUMMARY OF THE INVENTION

The instant invention avoids the shortcomings of the prior art methods of combining divergence and thrust control. The apparatus of the instant invention provides for a wide range of different nozzle areas for providing maximum engine efficiency through a wide range of aircraft flight conditions, a wide range of degrees of engine thrust reversing and aircraft vectoring by a simple lightweight structure.

The primary object of the invention is to provide a lightweight combined nozzle area control, thrust reversing and aircraft vectoring apparatus.

Another object of the invention is to provide a combined nozzle area control and thrust reversing apparatus that is selectively operable by a common actuation and control means.

Still another object of the invention is to provide a combined nozzle area control and thrust reversing apparatus that provides a wide range of different nozzle areas and degrees of thrust reversing.

These and further objects of the invention will become apparent from the following description taken together with the accompanying drawings.

BRIEF DESCRIPTION OF THE DRAWINGS

FIG. 4 shows an actuation mechanism taken along lines 4—4 of FIG. 1a;

DETAILED DESCRIPTION OF THE PREFERRED EMBODIMENT

Throughout the drawings and specifications, the same numerals are used to depict the identical element or part.

Referring now to FIGS. 1a–d, an upper cross-sectional view of the apparatus of the combined divergent nozzle and thrust reversing apparatus in their various operational positions is shown. It should be understood that throughout the following discussion the upper portion (shown) and the lower portion (not shown) have exactly the same configuration and are operated with a single actuator that operates both doors of the two door configuration. In the alternate three door configuration, either two or three actuators are utilized for door operation as hereinafter discussed in detail.

Figure 3:
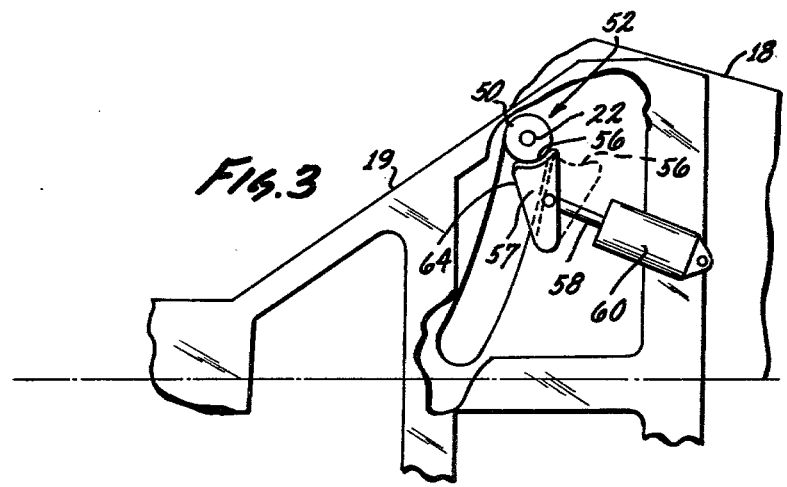
FIG. 3 shows one pivot pin connection of the nozzle-reverser door to the aircraft.
Figure 4:
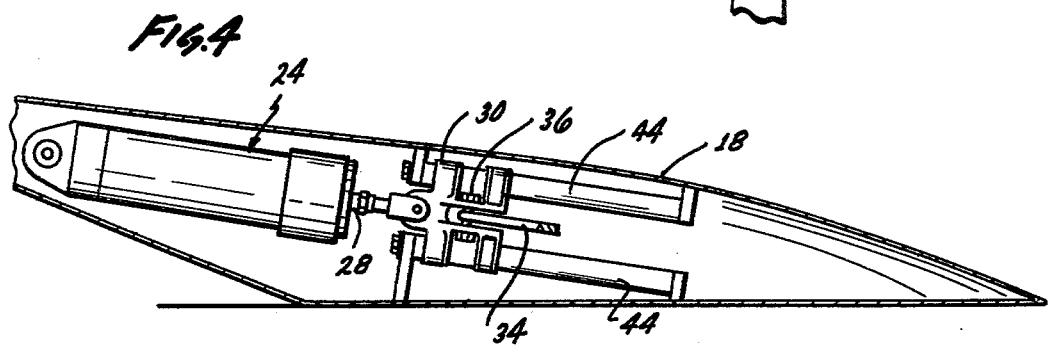

A streamlined housing 10 is shown which follows the general streamlined configuration of the normal fuselage after body cowl of the aircraft (not shown), is attached either to the aircraft frame structure or the rear portion or nozzle of the engine 12 by conventional attachment means, such as bolts 14. This aircraft attachment may be accomplished by any suitable means other than that means shown. The streamlined housing 10 includes a pair of nozzle-thrust reverser doors 16 (the upper door shown) and the forward housing with integral side fairings 18. Positioned between the doors 16 and located in the side cowling 18 are rear door pivots and actuation mechanism support means 19 (see FIG. 3). The forward door pivot support 20 generally takes any convenient form suitable for the weight and forces to which it is subjected within its working environment.

Figure 1A:
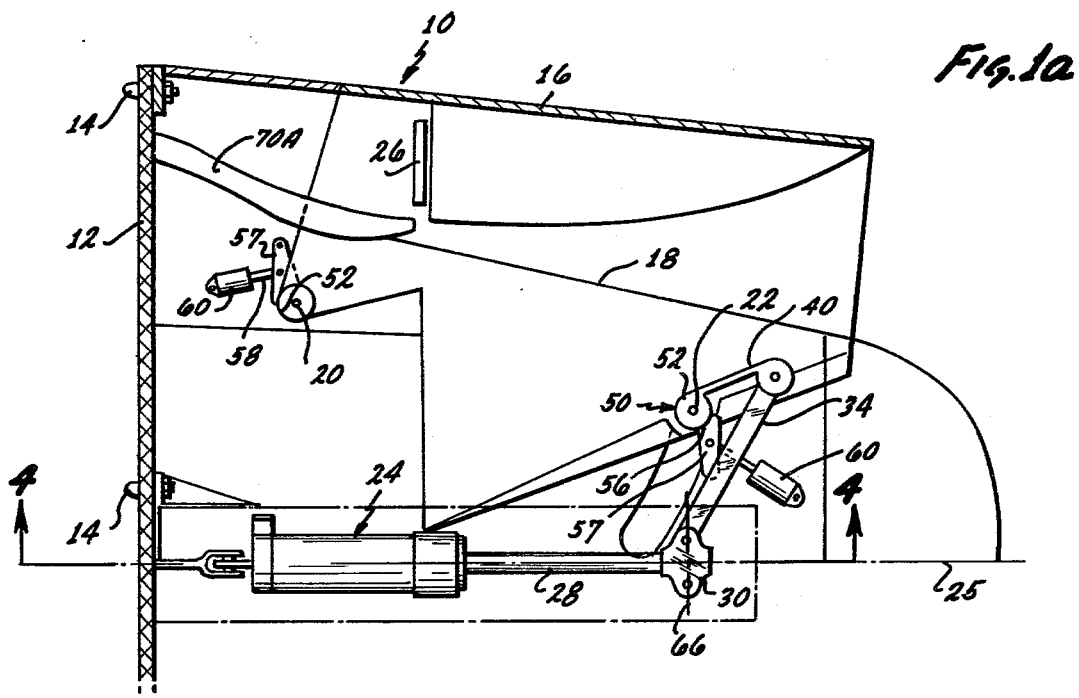
FIG. 1a shows upper one half the apparatus of the invention with the nozzle-reverser doors in the maximum divergent position.
Figure 1B:
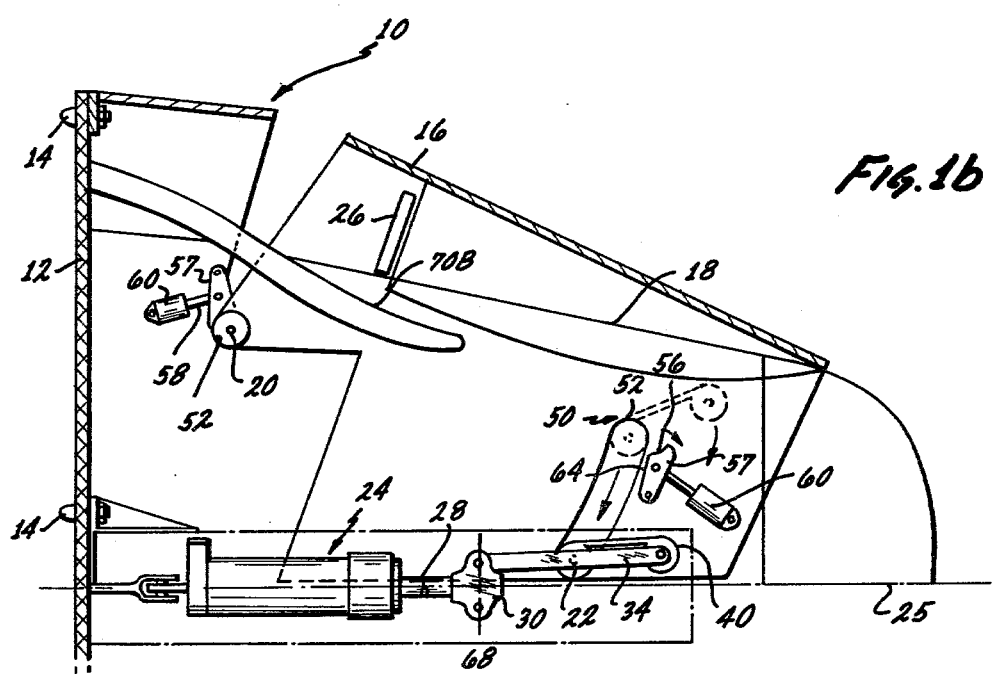
FIG. 1b shows the FIG. 1a apparatus with the nozzle-reverser doors in the maximum convergent position.
Figure 1C:
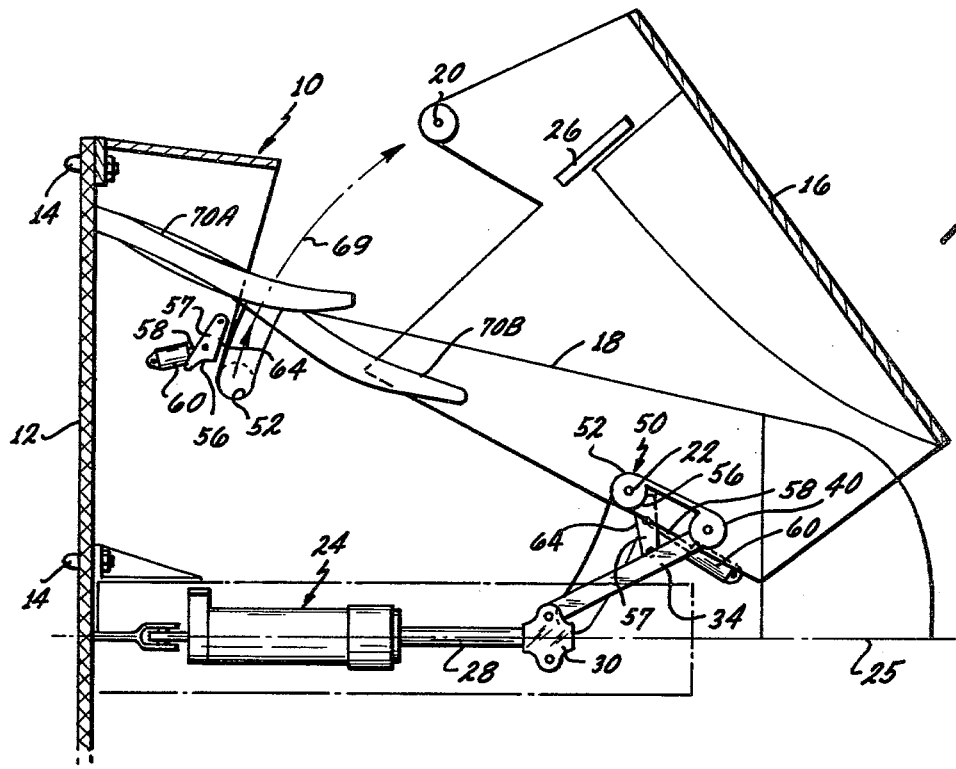
FIG. 1c shows the FIG. 1a apparatus with the nozzle-reverser doors in a partial reversing mode for reduced forward thrust.
Figure 1D:
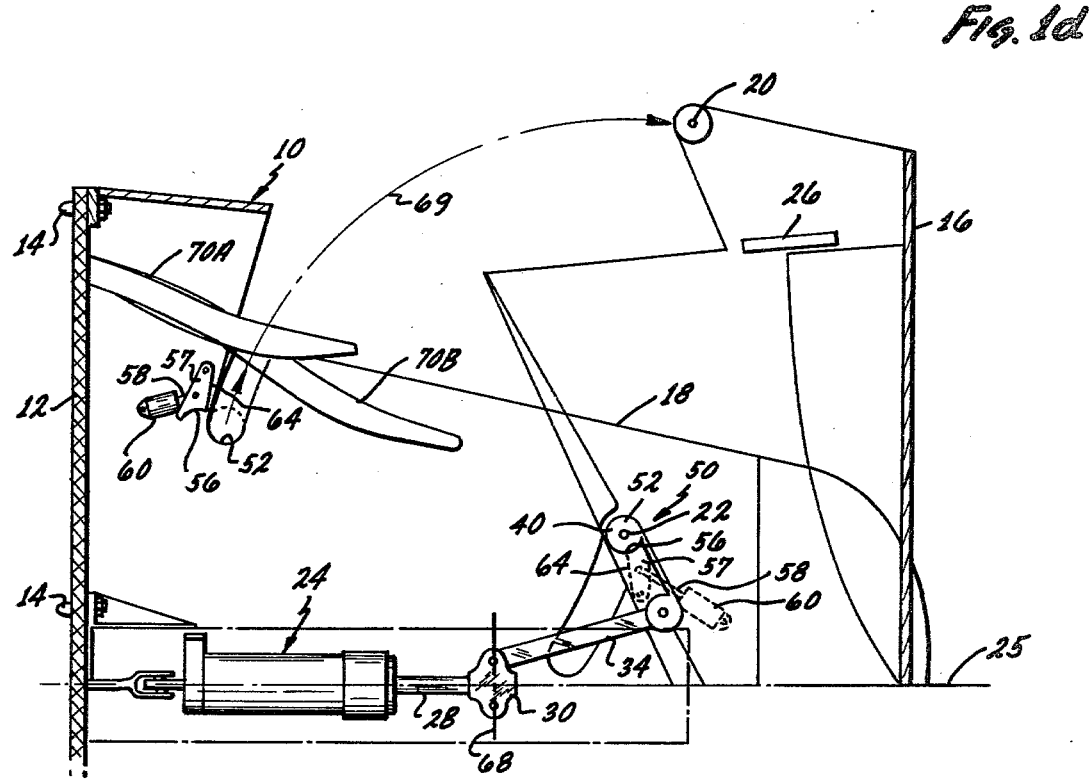
FIG. 1d shows the FIG. 1a apparatus with the nozzle-reverser doors in a full reversing mode.

The inner surface of the nozzle-reverser door 16 is shaped to provide the optimum divergent nozzle for the specific application geometry. In FIG. 1a the inner surface of the door 16 becomes an extension of the engine convergent nozzle 70A which is shown in the after-burning mode. In FIG. 1b the inner surface of door 16 must be compatible with the engine convergent nozzle 70B to provide for minimal losses in the cruise mode. In FIG. 1c and 1d the convergent nozzle 70A and 70B is in either extreme position or any intermediate position. A retractable end plate 26 is retracted during nozzle modulation modes and deploys as the nozzle-reverser door 16 deploys. The end plate 26 is driven by any convenient means, such as, an eccentric bell crank link system.

The thrust reverser doors 16 each have forward and aft pivot connections 20, 22 respectively attached in part to the door and an actuation mechanism support 19 for allowing the doors to pivot movement about one of these pivot connections when the other one of the pivot connections is selectively disengaged. When the aft pivot connection 22 is disengaged, the door 16 pivots about the forward pivot connection 20 (see FIG. 1b), providing varying degrees of divergence of the thrust gases flowing rearward and adjacent to their inner surfaces. The doors pivoting in this manner provide for an infinite number of different divergent nozzle-reverser door positions. When the forward pivot connection 20 is disengaged, the doors pivot about the rear pivot connection 22 providing an infinite number of varying degrees of in flight thrust modulation and full thrust reversing positions (see FIGS. 1c and 1d).

The device will provide vertical thrust vectoring by selectively choosing to deploy the upper nozzle-reverser door by unlocking the forward pivot 20 and rotating about aft pivot 22 and on the lower nozzle-reverser door unlocking aft pivot 22 and rotating about the forward pivot 20 resulting in a nose up pitching moment. By reversing these door positions, a nose down pitching moment is accomplished.

Figure 8:
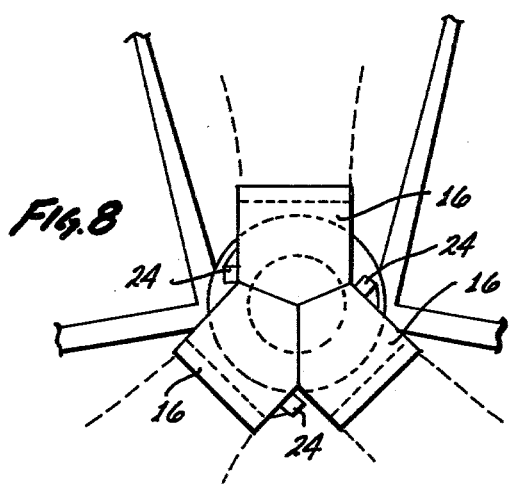

Referring now to FIGS. 1a-d and 4, the actuating means for providing rotational movement to the doors in the two door embodiment is a single linear actuator 24 interconnected to both of the doors. The three door embodiment, shown shown in FIGS. 8 and 9, require at least two actuators 24, see FIG. 9; however, some specific systems may require a minimum of three actuators 24, as shown in FIG. 8. The actuators of the various embodiments operate in the same or similar manner. For ease of explanation, only the two door system will be explained in detail.

Figure 2:
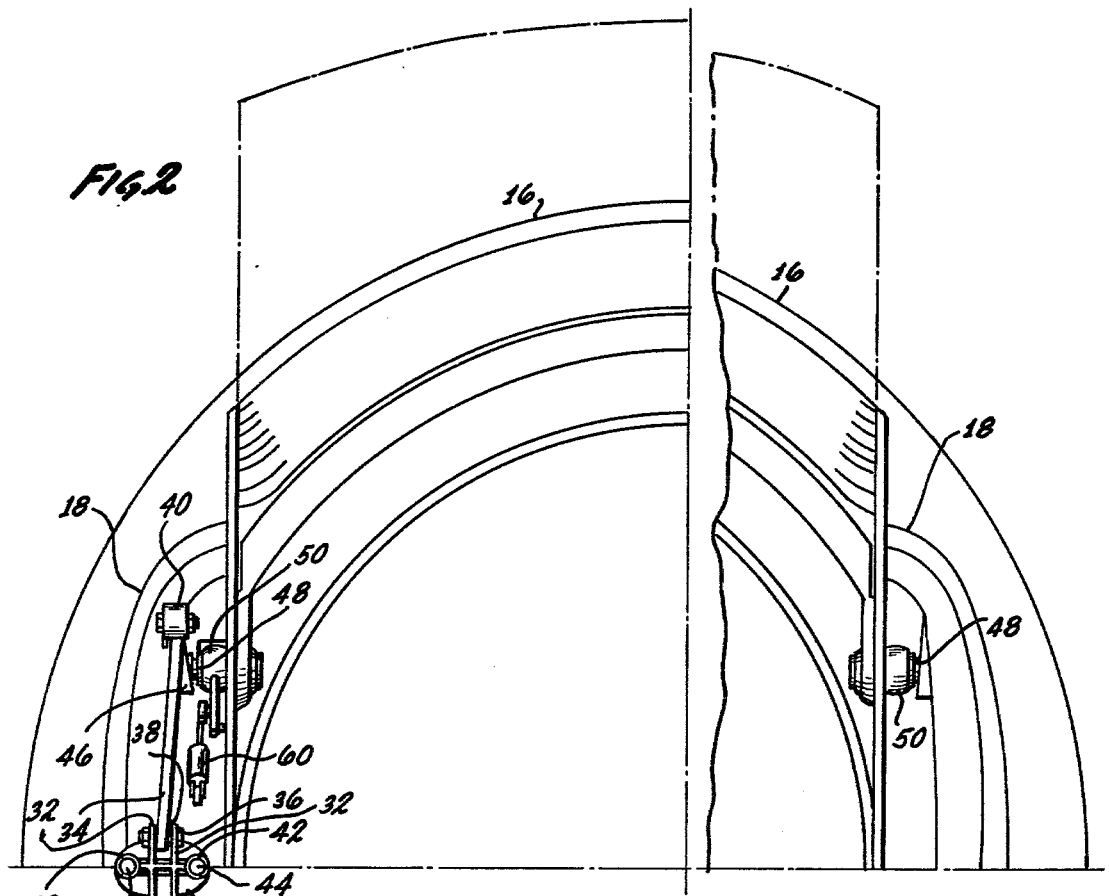
FIG. 2 shows a portion of the upper one-half of an end view of FIGS. 1a–d.

The actuator body 24 is fixedly attached to the aircraft structure through the door aft pivot 22 and actuation mechanism support 19. The actuator shown and described is of the linear hydraulic type having an internal piston, not shown, connected to rod 28 which is attached to a sliding fitting 30. The slide fitting 30 has two diametrically opposed clevises 32 which are positioned symmetrically with the centerline of the rod 28. Each of the clevises 32 provide a pivotal connection to a link 34 (only the upper link being shown). The link 34 is positioned within the clevis 32 and held in place by suitable connector means 36, such as, but not limited to, a nut and bolt combination. The connection is provided with a ball joint 38 so that the link 34 may be angled between the clevis and its upper connection (see FIG. 2). The upper end of the link is coupled to a bell crank 40 through a ball joint 38 in the same manner as its clevis attached end.

The slider 30 is further provided with sliding bores 42 that engage a pair of guide rods 44 that attach to the support 19. These guide rods 44 provide a track for guiding the slider 30 in a substantially linear fashion while providing additional support to the pivoting apparatus.

The end 46 of the crank 40 opposite the link attach end is fixed to one end of the shaft 48. The other end of the shaft is fixedly attached to its associated door 16 in any suitable manner so that the door pivots with movement of the crank. This door to shaft connection may be attached by spline and splineways, keys and keyways or the like with a keeper nut threaded to at least one end of the shaft with either a second keeper threaded to the opposite end of the shaft, or one end of the shaft may have an enlarged retainer head riding against the crank outer surface or door inner surface or any other suitable method known in this art. The shaft 48 passes through a spherical bearing 50 which is retained in the slot socket 52 by surface 56 of a pawl 57 pivotably connected to a plunger 58 of a linear actuator 60, such as, but not limited to, an electric solenoid. When the actuator 60 is de-energized, the plunger 58 is biased outwardly, see FIG. 3, by an internal spring (not shown), the shaft 48 is held in place and the door 16 can now be pivoted about that pivot connection 22. The shaft 48 is releasable from its captive pivot position 22 by energizing the solenoid 60, causing the plunger 58 to be pulled inward against the spring pressure toward the shaft solenoid retracted position, (see FIG. 3 phantom). When the solenoid is energized, the pivot connection 22 is then released, allowing the shaft 48 full movement away from the slot socket 52 in the support 19 while pivoting about the forward door pivot connection 20 by the operation of the linear actuator 24. It should be understood that both pivot 20, 22 may be secured and/or released in the same manner as described above. The two pivots being interlocked so that they cannot be simultaneously unlocked. When the shaft 48 is to be returned to its locked in place position, the linear actuator rod 28 moves rearward, allowing the floating shaft 48 to move outward from actuator center line 25 toward the support 19. During the travel of either shaft 48 toward the slot socket 52, it comes in contact with the surface 64 of the pawl 57, and rides therealong with the surface acting as a cam to force the solenoid plunger 58 against the internal spring outward biasing means until the shaft 48 rides over curvilinear surface 64 onto the bearing surface 56. The biased plunger positions the pawl 57 so as to hold the shaft 48 in a locked position. The shaft pivotal connection 22 described was directed to that connection by and including the crank, links and actuator. The other pivotal connectors of the door (the opposite side of both 20 and 22) operate in a similar manner except that the crank, links and actuator are not necessary, and the shaft is secured to the door at one end and the aircraft attachment means in a similar manner as hereinbefore discussed. It should be clear that each pair of forward and aft pivot locks include a similar linear actuated device or the equivalent thereto. It should also be understood that the solenoids 60 of both doors 16 may be operated together in pairs, i.e., both forward or aft pivotal connection, or separately in pairs, i.e., both forward or aft on one door opposite from the other door according to the operational mode selected.

It should be understood that both forward and aft pivot locks must not be released at the same time. The solenoid circuits are interlocked so that when any one pivotal connection is released, the other cannot be released. The opposing pivotal connections must be locked in place before either connection can be released.

Figure 5:
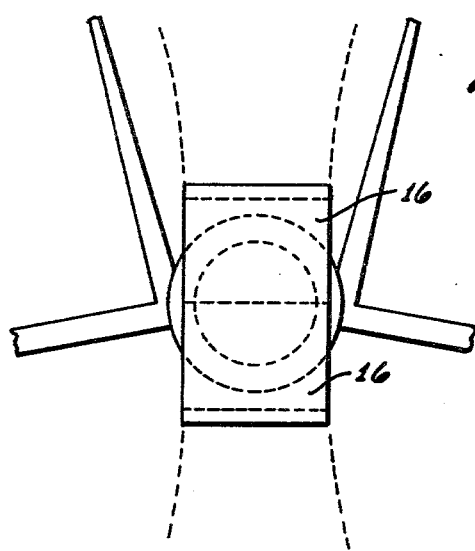
FIGS. 5-9 show various aircraft and door configuration utilizing the instant invention.

FIG. 5 shows an embodiment of the invention adapted to a twin tail single engine aircraft.

Figure 6:
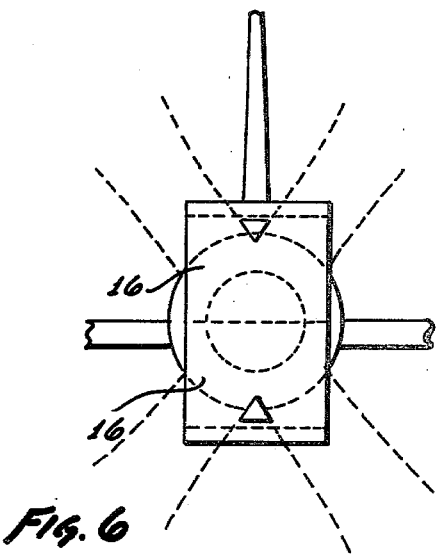

FIG. 6 shows an embodiment of the invention adapted to be a single tail single engine aircraft and further includes deflector means for deflecting the reversed gases away from the aircraft structure.

Figure 7:
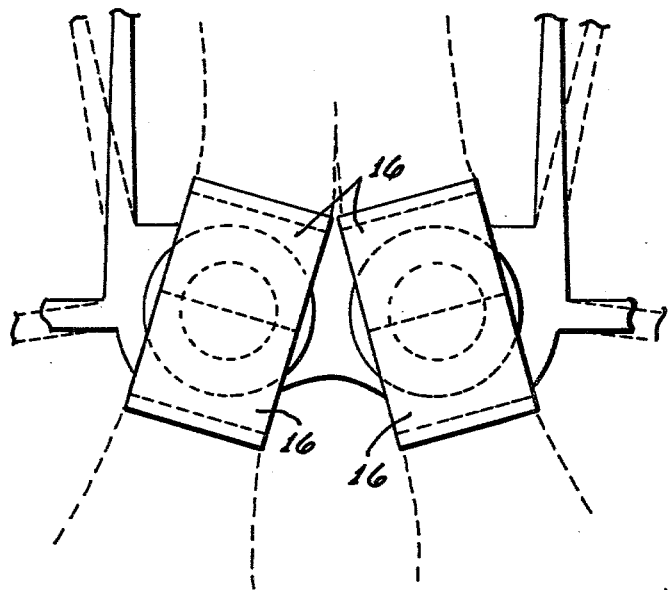

FIG. 7 shows an embodiment of the invention on a twin tail twin engine aircraft.

FIG. 8 shows a three door embodiment adapted to a twin tail single engine aircraft.

Figure 9:
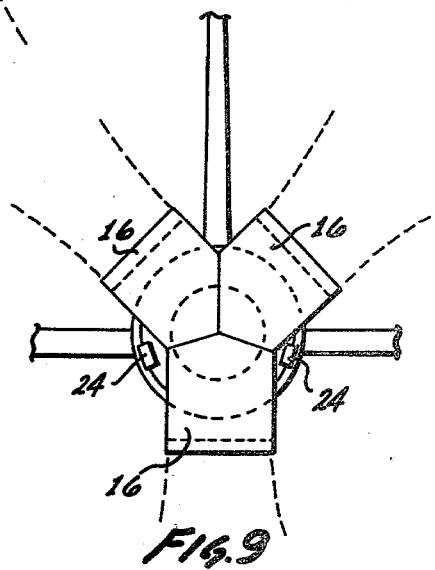

FIG. 9 shows a three door embodiment adapted to a single tail aircraft and further includes deflection means for deflecting the reversed gases away from the aircraft along paths shown by dashed lines.

OPERATION OF THE PREFERRED EMBODIMENT

Initially both the forward and aft pivotal connection 20, 22 respectively of the doors 16 are secured in a locked position by the inaction of their various solenoids 60. Forward thrust divergent nozzle control is the normal mode of operation and is responsive to an input signal derived from the engine pressure ratio system (not shown) or any other suitable control means to provide auto divergent nozzle control, the aft solenoids 60 on both doors 16 are activated, releasing the aft pivot connection 22. The actuator 24 is then activated and moves until the selected degree of divergence is achieved. The solenoids 60 may be de-energized when the actuator rod 28 moves the shafts 48 out of their nested position. The doors are positionable through an infinite range of different positions from stowed to fully deployed as hereinbefore described, between positions 66 and 68 of the slide 30. If thrust reversing action is desired, the doors must be returned to their stowed position, where both pivotal connections 48 are again secured in the slot socket 52. The forward solenoids 60 are then activated, releasing the forward pivotal connections 20. The actuator is then activated, moving slide 30 between 66 and 68 from stowed to full reverse moving the door through an infinite number of positions with varying degrees of increased partial reversing therebetween along arrows 69. It may be desirable for in-flight thrust vectoring by the action of a single door. If a single door is used in the two door system, the solenoids 60 at the forward pivotal connectors of one door are energized, along with the rear solenoids of the opposite door, thus one door acts in the manner of a reverser and the other in a divergent manner. In a three door system utilizing separate actuators for each door, only a single actuator and door would be activated for thrust vectoring.

Referring now to the various FIGS., a variable convergent nozzle 70 is shown. This nozzle is well known in this art and is translatable between 70 A and 70 B positions. This translation is coordinated with the various positions of the door 16 to maximize engine efficiency at the various flight conditions of the aircraft.

Having described preferred embodiments of the invention, though not exhaustive of all possible equivalents, what is desired to be secured by U.S. Letters Patent is distinctly claimed and particularly pointed out in the claims appearing below:

1. An integrated divergent and thrust reversing nozzle for controlling the exhaust exit gases from a thrust producing jet aircraft engine carried by an aircraft comprising:

a plurality of reverser doors, each of said doors having forward and rearwardly positioned pivot pins;

socket means carried by said nozzle for selectively engaging said pivot pins, at least one of said pivot pins of each of said plurality of doors being continuously engaged; and actuation means for pivoting said doors when each of said plurality of reverser doors have a single pivoted connection to said nozzle.

2. The invention as defined in claim 1, wherein two nozzle-reverser doors are employed.

3. The invention as defined in claim 1, wherein three nozzle-reverser doors are employed.

4. The invention as defined in claim 3, wherein said actuation means for pivoting said doors comprises two linear actuators.

5. The invention as defined in claim 1, wherein said actuator means comprises an aircraft mounted actuator interconnected to each side of said nozzle reverser-doors through linkage means.

6. The invention as defined in claim 5, wherein said actuator is a linear actuator.

7. The invention as defined in claim 1, wherein each socket means is separately engageable and disengageable from a remote location while said aircraft is in flight.

8. The invention as defined in claim 1, wherein both pivot pins of each of said reverser-doors must be engaged before either of said pins can be released.

* * * * *